United States Patent [19]

Uetsuki

[11] Patent Number: 5,251,065
[45] Date of Patent: Oct. 5, 1993

[54] POLARIZING SCREEN AND PROJECTOR USING THE SAME

[75] Inventor: Masao Uetsuki, Kurashiki, Japan

[73] Assignee: Kuraray Co., Ltd., Kurashiki, Japan

[21] Appl. No.: 921,219

[22] Filed: Jul. 29, 1992

[30] Foreign Application Priority Data

Jul. 31, 1991 [JP] Japan ................................ 3-215829
Jul. 31, 1991 [JP] Japan ................................ 3-215830

[51] Int. Cl.$^5$ .................... G03B 21/60; H04N 9/31
[52] U.S. Cl. ................................ 359/454; 358/61; 359/486
[58] Field of Search ............. 355/1; 359/443, 452, 359/454, 485, 486, 465; 358/3, 60, 61, 88

[56] References Cited

U.S. PATENT DOCUMENTS

| | | | |
|---|---|---|---|
| 2,362,573 | 11/1944 | MacEille | 359/455 |
| 2,380,241 | 7/1945 | Jelley et al. | 359/460 |
| 3,319,519 | 5/1967 | Shelanski | 352/87 |
| 3,473,872 | 10/1969 | Okamura | 355/1 |
| 4,582,393 | 4/1986 | Sheiman | 350/132 |
| 4,719,482 | 1/1988 | Hora | 350/91 |
| 4,744,633 | 5/1988 | Sheiman | 350/132 |
| 4,792,850 | 12/1988 | Liptoh et al. | 358/92 |
| 4,853,769 | 8/1989 | Kollin | 358/88 |
| 4,884,131 | 11/1989 | Chevion | 358/88 |
| 5,086,354 | 2/1992 | Bass et al. | 359/465 |
| 5,162,897 | 11/1992 | Jitsukata et al. | 358/60 X |

FOREIGN PATENT DOCUMENTS

| | | |
|---|---|---|
| 3227739 | 1/1984 | Fed. Rep. of Germany . |
| 62-266980 | 11/1987 | Japan . |
| 64-77085 | 3/1989 | Japan . |
| 2267536 | 11/1990 | Japan . |
| 0035147 | 1/1991 | Japan . |

*Primary Examiner*—Richard A. Wintercorn
*Attorney, Agent, or Firm*—Oblon, Spivak, McClelland, Maier & Neustadt

[57] ABSTRACT

A polarizing screen for visually presenting a picture in response to receipt of projected imagewise rays of light having a polarizing fabric overlaying a first surface of the screen base facing a viewer and operable to pass therethrough the projected imagewise rays of light having the first polarizing direction, but absorb rays of light having a second polarizing direction. The polarizing fabric includes a plurality of juxtaposed polarizing fibers and a plurality of juxtaposed non-polarizing fibers interlaced with the juxtaposed polarizing fibers so as to extend perpendicular to said juxtaposed polarizing fibers. Instead of the polarizing fabric, a non-woven sheet having the polarizing fibers juxtaposed thereon may be used. With this polarizing screen including the polarizing fabric or the polarizing fibers capable of polarizing rays of light having a polarizing direction conforming to the polarizing direction of the projected rays of light, the picture projected on the polarizing screen can be kept at a high contrast. The polarizing fabric 2 or the polarizing fibers can easily be prepared not only in a large flat shape, but also in a curved shape.

16 Claims, 8 Drawing Sheets

POLARIZING SCREEN AND PROJECTOR USING THE SAME

BACKGROUND OF THE INVENTION

1. Field of the Invention

The present invention generally relates to a polarizing screen, a picture projector using the polarizing screen and a polarizing screen material used for the polarizing screen. More particularly, the present invention relates to the polarizing screen for use in association with a projection-type television receiver set utilizing a liquid crystal display device for providing a high-contrast projected picture comfortable to view, a projector system including the polarizing screen and a polarizing member for polarizing rays of light emitted from a light source, and a polarizing fabric and a polarizing fiber utilizable as material for the polarizing screen or the polarizing member.

2. Description of the Prior Art

A projection-type television receiver set is well known which generally comprises a source of televised pictures, a projector optics and a screen. The demand for the projection-type television receiver set utilizing a liquid crystal display device is now increasing. However, the projection-type television receiver set has a problem in that, since a televised picture projected by a projector is enlarged, the resolution of the projected picture is low enough to make it difficult for a viewer to enjoy looking the projected picture. The resolution and/or contrast of the projected picture are further lowered when the projection-type television receiver set is operated in a fairly bright room since the screen reflects external rays of light towards the position of the viewer.

Various attempts have, therefore, been made to improve the viewability of the screen such as disclosed in, for example, the Japanese Laid-open Patent Publications No. 62-266980 (published in 1987) and No. 64-77085 (publi. in 1989) and Laid-open Utility Model Publication No. 3-5147 (publi. in January, 1991). According to these prior attempts, the use has been made of a first polarizing film having a first polarizing direction and a second polarizing film having a second polarizing direction lying perpendicular to the first polarizing direction of the first polarizing film. The first polarizing film is disposed on a front surface of the screen facing towards the position of a television viewer and the second polarizing film is disposed around an indoor illuminator such as an indoor illuminating lamp, so that rays of light emitted from the indoor illuminator and polarized by the second polarizing film are absorbed by the first polarizing film thereby to provide a projected picture that is comfortable to look.

While most of the color projection-type television receiver sets now in use utilize a color picture projector comprising a set of bulky and heavy cathode ray tubes, it is a recent trend to employ a liquid crystal display device in place of the cathode ray tube. So far as the screen size of 60 inches or more is concerned, the use of the liquid crystal display device for the picture projector is generally considered advantageous.

However, while external rays of light such as sunlight and those originating from indoor illuminating lamps are not generally polarized, rays of light originating from the liquid crystal display device are linearly polarized. In view of this, the Japanese Laid-open Patent Publication No. 2-267536, published in 1990, suggests the use on the screen of a polarizing film capable of passing therethrough only projected rays of light polarized in a particular direction so that the external rays of light having a direction of polarization different from the particular direction of polarization of the projected rays of light can be absorbed by the screen, thereby suppressing any possible reduction in contrast of the projected picture and also to provide the sharp projected picture even in a bright environment.

The polarizing film according to any one of the above discussed prior art techniques is made of a stretched film of polymer such as, for example, poly(vinyl alcohol), absorbed with iodine or organic dichroic dyes of, for example, benzidine, dianisidine, tolidine or stilbene. Therefore, when it comes to the polarizing film having a relatively large surface area for use in the screen of a large screen size, it is not easy to stretch the film in required directions so as to have a required surface area. Where a plurality of small polarizing films are joined together so as to have the required surface area, the presence of joints of the small polarizing films may cause a reduction in image quality of the picture that is eventually projected. In addition, the prior art polarizing film makes it difficult to form thereon fine indentations that are generally required for adjustment of the viewing angle.

A polarizing member made up with fibers, not film, is disclosed in, for example, the Japanese Laid-open Patent Publications No. 51-149919, published in 1976, and No. 63-275787 published in 1988. The polarizing member disclosed therein is exclusively for use in clothing and any one of these publications has failed to suggest the use thereof in association with the projector screen.

SUMMARY OF THE INVENTION

The present invention has therefore been devised with a view to substantially eliminating the above discussed problems inherent in the prior art techniques and is intended to provide an improved polarizing screen of a type utilizing a woven polarizing fabric or polarizing fibers capable of polarizing rays of light having a polarizing direction conforming to the direction in which projected imagewise rays of light have been polarized, to provide a projected image of relatively high contrast and high sharpness and also to provide an adjustability in viewing angle.

It is another important object of the present invention to provide an improved video projector system comprising the polarizing screen of the type referred to above in combination with a polarizing member for polarizing illuminating rays of light emitted by an illuminator in a direction perpendicular to the direction of polarization of the polarizing screen, thereby to further improve the contrast and the sharpness of the projected picture.

It is a further important object of the present invention to provide the woven polarizing fabric and the polarizing fibers suited for use on the screen of the type referred to above, which can be manufactured in a relatively large flat shape and which can be rolled up into a compact size for storage when the screen is not in use.

In order to accomplish the foregoing objects, according to one aspect of the present invention, there is provided a polarizing screen for visually presenting a picture in response to receipt of projected imagewise rays of light having a first polarizing direction. This polarizing screen comprises a screen base having first and second surfaces opposite to each other, said first surface when the polarizing screen is in use facing a viewer of the picture projected on the polarizing screen, and a polarizing fabric overlaying the first surface of the screen base and operable to pass therethrough the projected imagewise rays of light having the first polarizing direction, but absorb rays of light having a second polarizing direction. The polarizing fabric includes a plurality of juxtaposed polarizing fibers operable to pass therethrough the projected imagewise rays of light having the first polarizing direction, but absorb rays of light having the second polarizing direction and a plurality of juxtaposed non-polarizing transparent fibers interlaced with said juxtaposed polarizing fibers so as to extend perpendicular to said juxtaposed polarizing fibers. Each of the polarizing fibers is made of material having an affinity with a polarization developing substance and added with the polarization developing material, said each polarizing fiber being elongated in a lengthwise direction conforming to the second polarizing direction.

In the practice of the present invention, instead of the polarizing fabric, only the polarizing fibers may be employed and may be disposed on the first surface of the screen base.

It is to be noted that the term "polarizing direction" used hereinbefore and hereinafter is to be understood as meaning a direction of vibration of electric fields of light. It is also to be noted that the term "(being) added" used in the context that the polarizing fiber according to the present invention is made of material added with the polarization developing material is to be understood as speaking of the fact that the polarization developing material is either mixed in, adsorbed by or deposited in each polarizing fiber.

According to the above described structure of the polarizing screen, the rays of light projected from the video projector and having the first polarizing direction will not be attenuated by the polarizing screen and, of the entire quantity of external rays of light impinging on the polarizing screen, a substantially entire amount of external rays of light having the second polarizing direction perpendicular to the first polarizing direction can be absorbed by the polarizing fibers thereby to avoid any possible reduction in contrast of the picture projected onto the polarizing screen, which would otherwise occur when external rays of light impinge on the polarizing screen. Even under a bright environment such as within the illuminated room, the picture projected onto the polarizing screen exhibits a sharp quality. If the polarizing fibers are chosen to have a cross-sectional shape such as, for example, round, oval or generally square cross-sectional shape, or the weaving density of the polarizing fibers interlaced with the non-polarizing fibers is suitably chosen in the case of the woven polarizing fabric, the viewing angle at which the viewer can look the projected picture in an optimum condition can be adequately adjusted.

The material having the affinity with the polarization developing substance is preferably chosen to be, for example, poly(ethylene-co-vinyl alcohol) on the account that, since poly(ethylene-co-vinyl alcohol) has a low index of refraction and a low index of birefringence, it is possible to suppress the surface reflection and also to improve the resolution; that the resultant polarizing fiber can exhibit a high gas barrier property and, therefore, when the resultant polarizing fibers are used in a screen of reflection type, oxidization of a reflector film can be prevented; and that the poly(ethylene-co-vinyl alcohol) can easily be manufactured by the use of any known technique.

According to another aspect of the present invention, there is provided a video projector system which comprises a video projector for projecting imagewise rays of light having a first polarizing direction onto the polarizing screen of the above described structure for visually presenting a picture in response to receipt of the projected imagewise rays of light, and a polarizing member adapted to be installed within a room, where the polarizing screen is installed, so as to face towards a source of light that is used to illuminate the room. The polarizing member in this video projector system is operable to polarize rays of light emitted from the light source and travelling towards the polarizing screen, and comprises a polarizing fabric or fibers operable to absorb rays of light having the first polarizing direction, but pass therethrough rays of light having the second polarizing direction.

In this video projector system, the polarizing member serves to impart to the illuminating light emitted by the light source a polarizing direction lying perpendicular to the direction of polarization achieved by the polarizing screen and, therefore, that portion of the illuminating light which has been polarized can be absorbed by the polarizing fibers forming the polarizing screen, thereby to further prevent the contrast of the projected picture from being reduced.

According to a further aspect of the present invention, the woven polarizing fabric or the polarizing fibers provided in accordance with the present invention has or have a structure represented by the woven polarizing fabric or the polarizing fibers which is or are fitted to a screen base to complete the above described polarizing screen.

With this woven polarizing fabric or the polarizing fibers, the polarizing fibers are easy to elongate in the lengthwise direction thereof as a general characteristic possessed by a textile fiber and, therefore, as compared with the conventional film, a use of the woven polarizing fabric or the polarizing fibers, particularly, a combined use thereof with the non-polarizing fibers can result an ease not only to fabricate it in a flat shape having a relatively large surface area, but also to process it to conform to a curved shape of the polarizing screen by the utilization of the flexibility possessed by the polarizing fibers.

According to a still further aspect of the present invention, each of the polarizing fibers used to cover a reflecting surface of the polarizing screen of reflection type has a generally oval cross-sectional shape. Each of the polarizing fibers has a ratio (b/a) of the minimum diameter b, as measured along the minor axis of the oval shape, relative to the maximum diameter a, as measured along the major axis of the oval shape, which is within the range of 0.70 to 0.95.

The generally oval cross-sectional shape of each polarizing fiber forming the woven polarizing fabric can be formed by thermally pressing or ironing a woven polarizing fabric including polarizing fibers of a generally round cross-section or by depositing a layer of transparent synthetic resin over the woven polarizing fabric. The woven polarizing fabric having its component elements of the generally oval cross-sectional shape is effective to provide a relatively large viewing angle in a direction perpendicular to the lengthwise direction of the component elements and would not result in an uneven distribution of brightness of the projected picture.

Preferably, each of the polarizing fibers is in the form of a mono-filament and non-polarizing fibers each in the form of a multi-filament are interposed between each neighboring polarizing fibers so as to alternate the polarizing fibers. According to this arrangement, gaps tending to be formed between each neighboring polarizing fibers which is relatively rigid because of the mono-filament can be filled up by the associated non-polarizing fibers which are flexible and pliable because of the multi-filaments, thereby avoiding any possible leakage of light which would occur through the gaps between each neighboring polarizing fibers.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views, and:

DETAILED DESCRIPTION OF THE EMBODIMENTS

Figure 1:
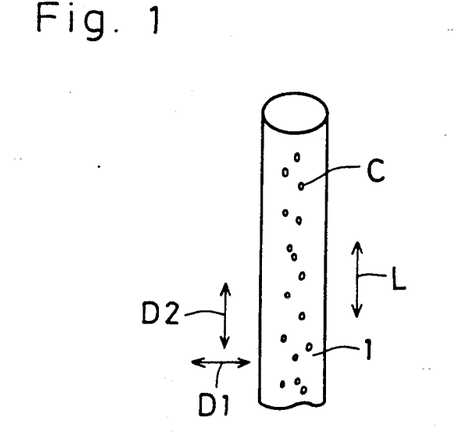
FIG. 1 is a schematic fragmentary perspective view of a polarizing fiber according to the present invention.

Specific embodiments of the present invention will now be described. Referring first to FIG. 1, there is shown a polarizing fiber 1 which is utilized to form a polarizing fabric according to the present invention. This polarizing fiber 1 is prepared by adding a polarization developing substance such as, for example, iodine or organic dichroic dyes to a fiber made of synthetic resin, for example, poly(vinyl alcohol) or poly(ethylene-co-vinyl alcohol) having an affinity with the polarization developing substance. This fiber 1 is stretched in a direction along its own longitudinal axis shown by the arrow L and, due to the presence of iodine clusters or organic dichroic dyes C oriented in a direction conforming to the longitudinal direction L of the polarizing fiber 1, the polarizing fiber 1 exhibits a polarizing function. Thus, it will readily be understood that the illustrated polarizing fiber 1 effectively pass therethrough rays of light having a polarizing direction (a plane in which electric fields vibrate) D1 perpendicular to the longitudinal axis L thereof, but absorb rays of light having a polarizing direction (a plane in which electric fields vibrate) D2.

The polarizing fiber 1 of the kind discussed above can be manufactured by the following illustrative method.

After poly(vinyl alcohol) (PVA) has been spun to produce a polymer fiber, the resultant polymer fiber is immersed in an aqueous solution containing iodine and alkali salt. Thereafter, the polymer fiber is stretched to a length which is 1.5 to 15 times the initial length thereof, thereby to produce the polarizing fiber 1. Alternatively, the stretching may be effected following the spinning to form the polymer fiber and prior to the polymer fiber being immersed in the aqueous solution containing iodine and iodine alkali salt.

In order to avoid any possible separation of the iodine from the polarizing fiber 1 and also to suppress the reflection of light from a surface of the polarizing fiber 1, the polarizing fiber 1 is, subsequent to the addition of iodine and the stretching operation, immersed in a solution containing polymers such as triacetyl cellulose to coat the surface of the fiber with a transparent resin.

The polarizing fiber 1 can also be manufactured using polymer such as, for example, poly(ethylene-co-vinyl alcohol) in place of the poly(vinyl alcohol) and adding organic dichroic dyes of benzidine, in place of the iodine, before or after the spinning operation.

However, the use of poly(ethylene-co-vinyl alcohol) as a polymer for the polarizing fiber 1 is preferred by the following reasons. In the first place, since poly(ethylene-co-vinyl alcohol) is a non-aromatic substance exhibiting a low index of refraction and a low index of birefringence, it is possible to suppress the surface reflection and also to improve the resolution. In the second place, the resultant polarizing fiber 1 can exhibit a high gas barrier property and, when the resultant polarizing fiber is used in a screen of reflection type, oxidization of a reflector film (for example, an aluminum film) can be prevented. Also, the use of poly(ethylene-co-vinyl alcohol) makes it easy to manufacture the polarizing fiber by means of the spinning technique.

Also, the use of the organic dichroic dyes is preferred because it can result in the polarizing fiber having a high resistance to moisture and a high resistance to light-induced aging and also having a high resistance to heat enough to render itself to be thermally moldable during a subsequent processing stage. It is to be noted that, although the degree of polarization exhibited by the use of the organic dichroic dyes may be lower than that exhibited by the use of iodine, the degree of polarization exhibited by the screen is generally within the range of 80 to 95% and, therefore, the use of the ordinary organic dichroic dyes suffices.

The polarizing fiber 1 may have any suitable cross-sectional shape, for example, round, oval or square. Preferably, the polarizing fiber 1 has a diameter within the range of 10 micrometers to several hundreds micrometers, although the diameter of the polarizing fiber 1 may vary depending on the capability of being woven together with non-polarizing fibers, the flexibility of the screen required to permit the screen when not in use to be rolled up, the resolution of the picture projected onto the screen, the extent to which the Moire pattern resulting from a periodic structure of pixels of the liquid crystal display device and the fibers can be minimized, and/or other conditions.

Figure 2:
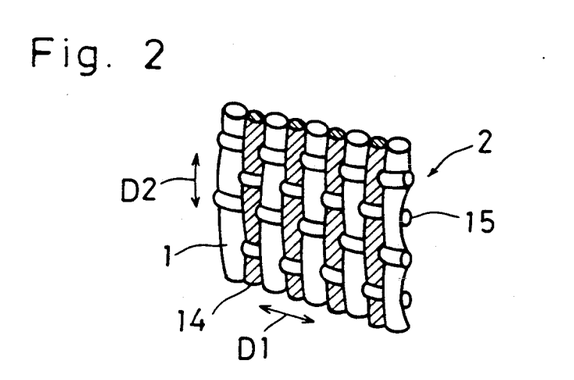
FIG. 2 is a schematic fragmentary perspective view of a woven polarizing fabric formed by the use of the polarizing fibers shown in FIG. 1.

A woven polarizing fabric 2 made from the polarizing fibers 1 is shown in FIG. 2. This woven polarizing fabric 2 comprises a plurality of juxtaposed polarizing fibers 1 and a plurality of non-polarizing opaque fibers 14 alternating the polarizing fibers 1 in parallel relation thereto, said polarizing and opaque fibers 1 and 14 being interlaced by means of a plurality of non-polarizing fibers (an alternating pattern of opaque fibers with transparent fibers) 15 that extend generally perpendicular to any one of the alternating polarizing and opaque fibers 1 and 14. With the woven polarizing fabric 2 interwoven in a matrix pattern containing the polarizing and opaque fibers 1 and 4 and the non-polarizing fibers 15 perpendicular thereto, it will readily be seen that the alternating polarizing and opaque fibers 1 and 14 constitute, for example, the warp, and the transparent fibers 15 constitute the weft. This woven polarizing fabric 2 can exhibit a polarizing characteristic substantially identical with that exhibited by the polarizing fibers 1 and, therefore, the woven polarizing fabric 2 allows a passage of the rays of light having a first polarizing direction D1, but absorbs the rays of light having a second polarizing direction D2 perpendicular to the first polarizing direction D1.

The opaque fibers 14 referred to above are made up of white or colored multi-filaments and serve the following purpose. That is to say, since the polarizing fibers 1 are generally mono-filaments and are therefore relatively rigid, the colored fibers 14, made up of the multi-filaments which are generally flexible and pliable, fill up gaps which tend to be formed among the relatively rigid polarizing fibers 1 to avoid any possible leakage of light. The opaque fibers 14 serve to reflect rays of light if white in color, or to absorb rays of light if black in color, thereby to minimize a mix-up of rays of light passing through each neighboring polarizing fibers 1 and, at the same time, to bring about an effect similar to that brought about by the well known black stripe pattern used in a color cathode ray tube. Where no effect afforded by the black stripe pattern is required, the use of the opaque fibers 14 may be dispensed with.

Since the woven polarizing fabric 2 according to the present invention is easy to be stretched in a direction conforming to the longitudinal direction L of the polarizing fibers 1, the woven polarizing fabric 2 having a relatively large size can easily be manufactured as compared with the prior art polarizing film. Also, since the woven polarizing fabric 2 according to the present invention is flexible and pliable as compared with the prior art polarizing film, the woven polarizing fabric 2 can easily be bent into a curved shape and can therefore be rolled up into a compact size for storage when it is not in use.

Figure 3:
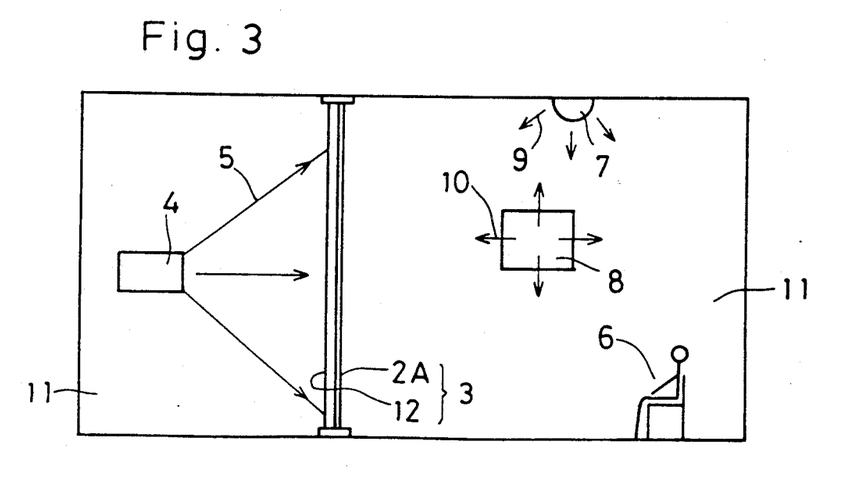
FIG. 3 is a schematic side view showing a polarizing screen of transmission type formed by the use of the polarizing fabric shown in FIG. 2.
Figure 4A:
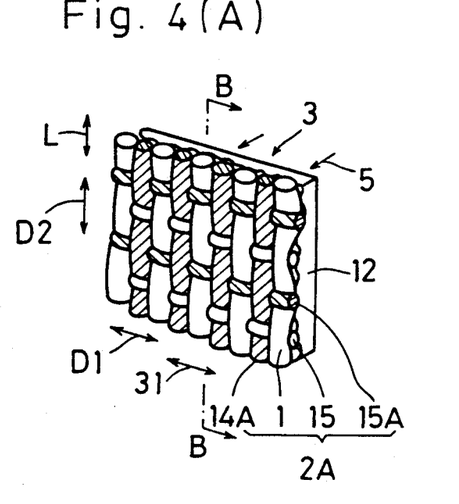
FIG. 4(A) is a schematic perspective view, on an enlarged scale, of a portion of the transmission-type polarizing screen shown in FIG. 3.
Figure 4B:
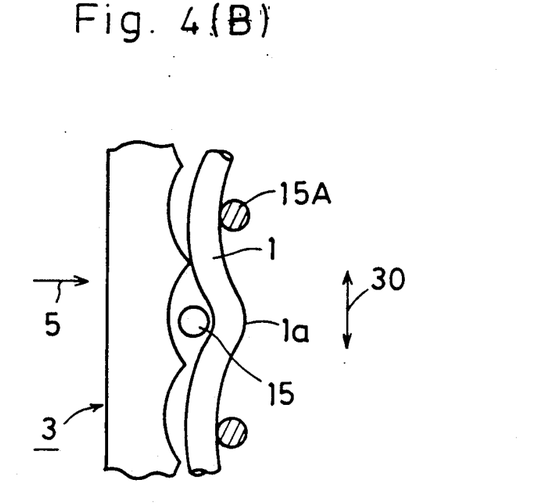
FIG. 4(B) is a schematic cross-sectional view taken along the line B—B in FIG. 4(A)

FIGS. 3 and 4 illustrate a polarizing screen of transmission type formed by the use of the woven polarizing fabric 2. Referring to FIG. 3, there is shown, for example, a house room 11 having a window 8 defined in one of side walls and a illuminating lamp 7 secured to the ceiling thereof. The polarizing screen of transmission type generally identified by 3 is hung downwardly from the ceiling, dividing the interior of the room 11 into rear and front compartments defined on respective sides thereof. A picture projector 4 comprising a liquid crystal display device is installed in the rear compartment so as to project a televised picture onto the polarizing screen 3 while a viewer 6 occupying a seat within the front compartment looks at the picture from opposite side, that is, in a direction counter to the direction in which the picture is projected towards the polarizing screen 3. Since the picture projector 4 utilizes the liquid crystal display device (not shown), the imagewise rays of light 5 projected by the picture projector 4 have a particular polarizing direction. So far shown in FIG. 3, the interior of the room 11 is illuminated not only by rays of light 9 emitted by the illuminating lamp 7, but also external rays of light 10, i.e., sunlight, entering through the window 8 and spreading in all directions within the room 11.

The transmission-type polarizing screen generally identified by 3 in FIG. 3 comprises, as best shown in, for example, FIG. 4(A), a screen base 12 having front and rear surfaces opposite to each other and made of a sheet of poly(vinyl chloride). The front surface of the screen base 12, which when the screen 3 is in use as shown in FIG. 3 faces the viewer 6, is embossed, imprinted or molded in any suitable manner to represent a lens pattern similar to a Fresnel lens and is covered by a woven polarizing fabric 2A.

As discussed in connection with the woven polarizing fabric 2 with reference to FIG. 2, the woven polarizing fabric 2A includes the polarizing fibers 1 and black or opaque fibers 14A alternating the polarizing fibers 1 and employed in the form of multi-filaments, said polarizing and black fibers 14A being interlaced by means of transparent, non-polarizing fibers 15 and black, non-polarizing fibers 15A alternating the transparent, non-polarizing fibers 15. The woven polarizing fabric 2 overlays the screen base 12 with its first polarizing direction D1 conforming to the particular polarizing direction of the rays of light 5 projected by the picture projector 4.

In this woven polarizing fabric 2A shown in FIG. 4(A), each of the transparent fibers 15 forming a part of the weft extends in a generally zig-zag fashion so as to pass between the screen base 12 and the respective polarizing fiber 1 and then over the next succeeding black fiber 14A while each of the black fibers 15A forming another part of the weft extends similarly in a generally zig-zag fashion, but in a sense opposite to the respective transparent fiber 15, that is, so as to pass between the screen base 12 and the respective black fiber 14A and then over the next succeeding polarizing fiber 1. Thus, as best shown in FIG. 4(B), portions of each black fiber 15A forming a part of the weft which intersect the polarizing fibers 1 forming a part of the warp are positioned on one side of the polarizing fiber 1 remote from the screen base 12 whereas portions of each transparent fiber 15 forming another part of the weft which intersect the polarizing fibers 1 forming a part of the warp are positioned on the other side of the polarizing fiber 1 adjacent the screen base 12, that is, between the polarizing fiber 1 and the screen base 12.

The polarizing screen 3 of the structure described above is, when in use, held flat or somewhat curved, and the polarizing fabric 2A which conform to the flat or curved shape of the polarizing screen can easily be obtained according to the present invention.

With the polarizing screen 3 in use as shown in FIG. 3, the polarizing screen 3 of the structure shown in and described with reference to FIGS. 3 and 4 is effective to allow a passage therethrough of a substantially entire amount of imagewise rays of light 5 projected from the picture projector 4 and, therefore, the picture being reproduced on the polarizing screen 3 can be advantageously kept in high luminance. On the other hand, except for a light component having the first polarizing direction D1, all of the rays of light 9 and 10 originating from the illuminating lamp 7 and the sunlight entering through the window 8 into the room 11 can be absorbed by the woven polarizing fabric 2A thereby minimizing the reduction in contrast of the reproduced picture which would occur when the ambient light 9 and 10 is reflected by the screen.

Also, since the black fibers 14A intervene between the neighboring polarizing fibers 1 as discussed above, the black fibers 14 serve to effectively avoid any possible mix-up of the projected rays of light 5 which would, if the fibers 14 were transparent, emerge outwardly through the fibers 14, thereby contributing to an improvement in resolution of the picture being reproduced on the polarizing screen 3. As a matter of course, the black fibers 14A are effective to avoid any possible leakage of light which would be apt to occur through gaps between the polarizing fibers 1 if no black fiber is employed.

Furthermore, since, as discussed with reference to FIG. 4(B), those portions of each black fiber 15A which intersect the polarizing fibers 1 are positioned on one side of the polarizing fibers 1 remote from the screen base 12 and, hence, close to the viewer 6, those black fibers 15A as a whole function in a manner similar to that of the so-called black stripes used in the existing color cathode ray tube, if the illuminating light are not polarized, thereby to increase the contrast of the picture being reproduced on the polarizing screen 3.

In addition, since those portions of each transparent fibers 15 which are positioned between the polarizing fibers 1 and the screen base 12 cause associated portions of the polarizing fibers 1, which intersect therewith, to bend to protrude outwardly in a direction away from the screen base 12 as indicated by 1a in FIG. 4(B), those protruding portions 1a of the polarizing fibers 1 serves to increase the viewing angle in a vertical direction 30 generally parallel to the lengthwise direction of the polarizing fibers 1. Moreover, each polarizing fiber 1 functions in a manner similar to a cylindrical lens and, hence, the viewing angle in a horizontal direction 31 transverse to the vertical direction 30, that is, in a direction generally perpendicular to the lengthwise direction of the polarizing fibers 1, can also be advantageously increased. Accordingly, the woven polarizing fabric 2A used in the polarizing screen 3 of the present invention serves as a lenticular lens.

Figure 5:
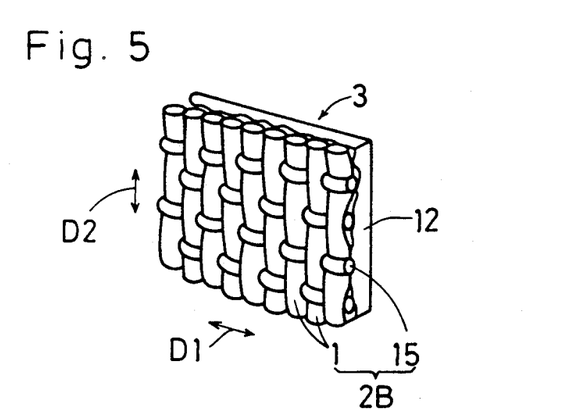
FIG. 5 is a view similar to FIG. 4(A), showing a modified form of the transmission-type polarizing screen.

It is to be noted that each of the polarizing fibers 1 may have any suitable cross-sectional shape, for example, oval or square, which may be chosen depending on the viewing angle required for the resultant polarizing screen 3 to satisfy. Since the protruding portions 1a of the polarizing fibers 1 are formed by causing the polarizing fibers 1 to partly protrude outwardly in a direction away from the screen base 12 in contact with those portions of the transparent fibers 15 which are positioned between the polarizing fibers 1 and the screen base 12, a suitable selection of the density of the transparent and black fibers 15 and 15A interlacing through the polarizing and black fibers 1 and 14A can result in an optimization of the curvature of each of the protruding portions 1a of the polarizing fiber 1 to accomplish the required viewing angle.

Where no effect similar to that afforded by the well known black stripe pattern is required in the polarizing screen 3 of the present invention, and/or where the polarizing fibers 1 themselves are flexible and pliable such as made of multi-filaments, the use of the black fibers 14 may be dispensed with as shown in FIG. 5. So far shown in FIG. 5, the woven polarizing fabric, indicated by 2B, comprises the transparent, non-polarizing fibers 15 interlaced through the polarizing fibers 1 made of multi-filaments. Since the woven polarizing fabric 2A or 2B is flexible and pliable, the polarizing screen 3 including the flexible screen base 12 and the woven polarizing fabric 2A or 2B can easily be rolled up in a compact size when the screen 3 is not in use, requiring a minimized space for storage thereof.

Figure 6:
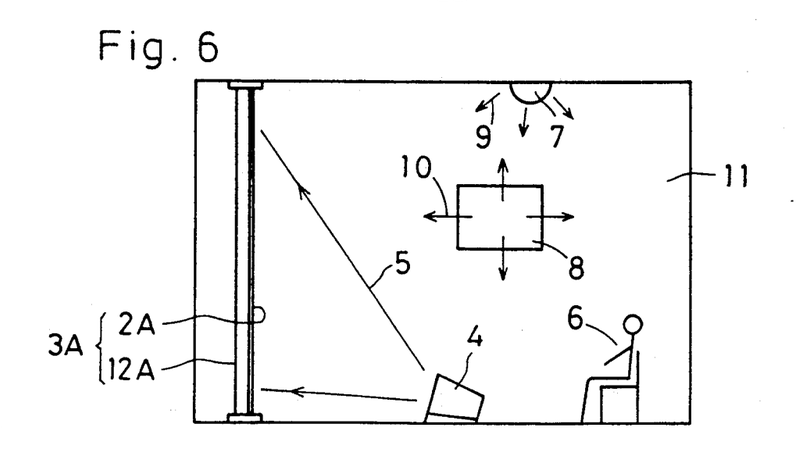
FIG. 6 is a view similar to FIG. 3, showing a polarizing screen of reflection type formed by the use of the polarizing fabric shown in FIG. 2.
Figure 7:
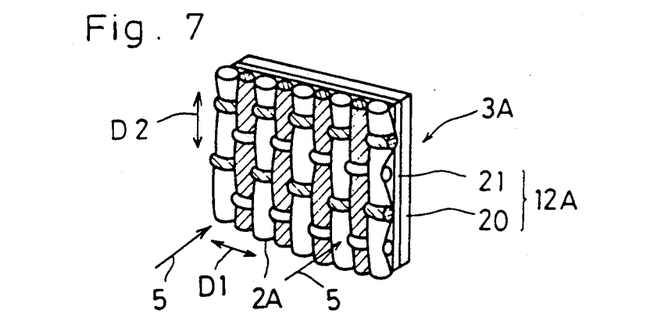
FIG. 7 is a schematic perspective view, on an enlarged scale, of a portion of the reflection-type polarizing screen shown in FIG. 6.

FIGS. 6 and 7 illustrates an embodiment of the present invention in which the polarizing screen identified by 3A is used as a reflection type operable to reflect the imagewise rays of light 5, projected by the picture projector 4, towards the viewer 6. As best shown in FIG. 6, when the reflection-type polarizing screen 3A is used, the picture projector 4 is placed frontwardly of the screen 3A and within the room compartment where one or more viewers 6 occupy. As is the case with the environment shown in FIG. 3, the compartment of the room 11 where the picture projector 4 is installed and the viewer 6 occupy is illuminated not only by the illuminating lamp 7, emitting rays of light indicated by 9, but also sunlight 10 entering through the window 8.

The reflection-type polarizing screen 3A is best shown in FIG. 7 and comprises a screen base 12A including a substrate 20 in the form of a sheet of, for example, poly(vinyl chloride), having front and rear surfaces opposite to each other, and a reflecting sheet 21 applied to the front surface of the substrate 20. And the polarizing fabric 2A of the structure shown in and described with reference to FIGS. 4(A) and 4(B) is applied to the screen base 12A so as to cover the reflecting sheet 21, thereby completing the polarizing screen 3A. As is the case with the polarizing screen 3 of transmission type, this polarizing screen 3A is also installed with the direction of polarization D1 of the woven polarizing fabric 2A conforming to the particular direction in which the imagewise rays of light 5 from the picture projector 4 have been polarized.

The reflecting sheet 21 used in the reflection-type polarizing screen 3A may be a sheet of transparent synthetic resin having a light reflecting layer formed by, for example, vapor depositing aluminum. The light reflecting layer may be formed on the back surface of the polarizing fabric.

Even the polarizing screen 3A shown in FIGS. 6 and 7 and brings about effects similar to those afforded by the polarizing screen 3A according to the previously described embodiment of the present invention.

Figure 8:
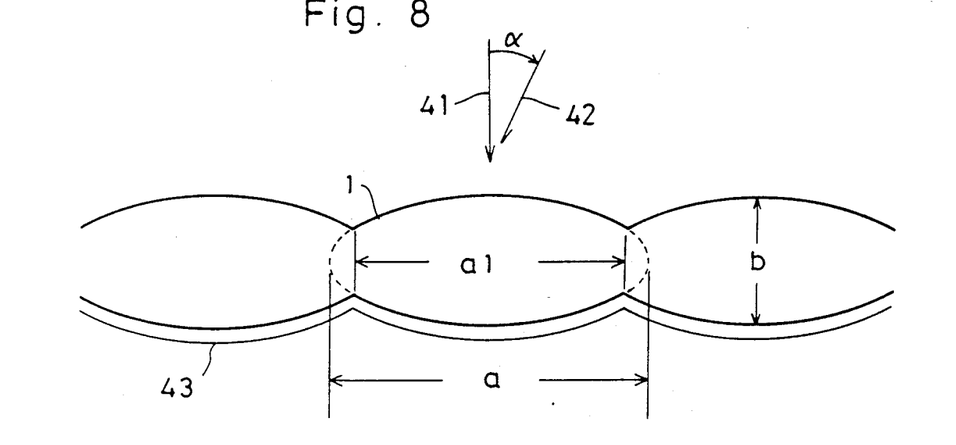
FIG. 8 is a schematic sectional view of the polarizing fiber used in a series of experiments conducted to measure the luminance thereof.

In order to determine the optimum cross-sectional shape of each of the polarizing fibers 1 used to form the woven polarizing fabric 2 for use in the reflection-type polarizing screen, the luminance which would be exhibited in a viewing direction 42 at an angle $\alpha$ relative to the imagewise rays of light 41 projected from a direction perpendicular to the major axis of the oval shape was calculated on each of a plurality of polarizing fibers 1 each being of a generally oval cross-sectional shape as shown in FIG. 8.

For the purpose of the calculation, a plurality of polarizing fibers of a generally uniform round cross-sectional shape were placed on a work bench in closely adjoining fashion with each other and were subsequently thermally pressed to allow each neighboring polarizing fibers 1 to fuse together while forming generally corrugated front and rear surfaces as shown in FIG. 8, each fiber 1 having a generally oval cross-sectional shape, thereby to provide a polarizing fiber mat having furrow portions equal in number to the polarizing fibers used. And on the back surface of the polarizing mat is formed a light reflecting layer 43 by depositing aluminum vapor. This polarizing fiber mat was used in a plural number during the calculation, having a different ratio (b/a) of the minimum diameter b, as measured along the minor axis of the imaginary oval cross-sectional shape depicted by a single furrow portion corresponding to the single polarizing fiber, relative to the nominal maximum diameter a of such imaginary oval cross-section, and also having a different ratio (a1/a) of the maximum diameter a1, as measured along the major axis of such imaginary oval cross-sectional shape and bound between dales on respective sides of the single furrow portion, relative to the nominal maximum diameter a.

Figure 9:
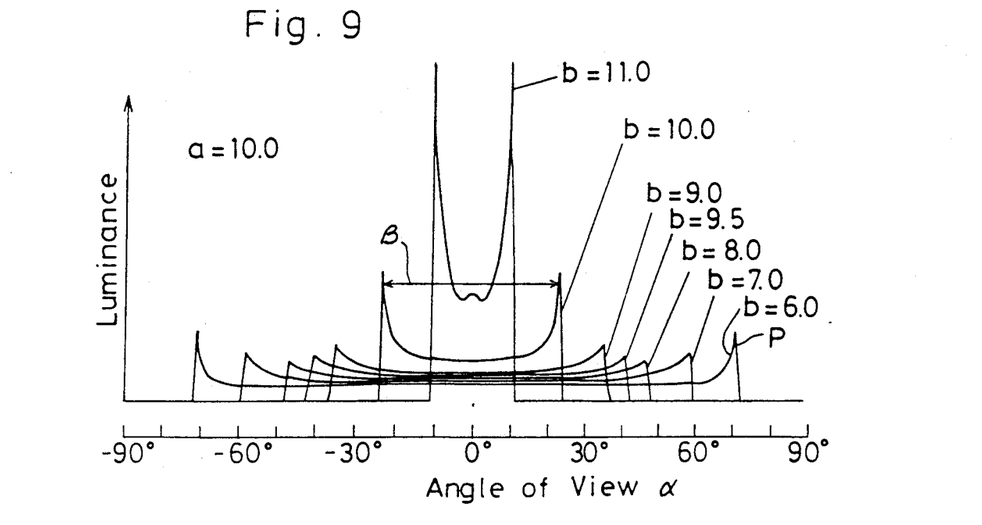
FIG. 9 is a graph showing results of the experiments conducted to measure the luminance of the polarizing fiber.

Results of the calculation made on each of the polarizing fiber mats to measure the luminance exhibited by each polarizing fiber 1, which were obtained when the ratio a1/a was chosen to be 0.95% for all polarizing mats and the nominal maximum diameter a is chosen to be 10 are shown in FIG. 9. As shown in the graph of FIG. 9, when the minimum diameter b exceeds 9.5 and, hence, the ratio b/a exceeds 0.95, the angle of coverage $\beta$ within which the viewer can look the projected picture satisfactorily is excessively reduced. On the other hand, when the minimum diameter b is smaller than 7.0 and, hence, the ratio b/a is smaller than 0.70, the peak value P of the luminance measured at a maximum value of the angle $\alpha$ of view tends to be extremely high as compared with the luminance measured at the other values of the angle $\alpha$ of view, resulting in an uneven luminance.

In view of the foregoing results of the calculation, in accordance with the present invention, the ratio b/a is preferred to be within the range of 0.70 to 0.95. Also, when the ratio a1/a is within the range of 0.80 to 0.95, the utilization of the projected imagewise rays of light can be maximized and, at the same time, the relatively large angle $\alpha$ of view can be available. It is to be noted that, to obtain the results shown in the graph of FIG. 9, the projected imagewise rays of light 41 was calculated as a plane wave.

Figure 10:
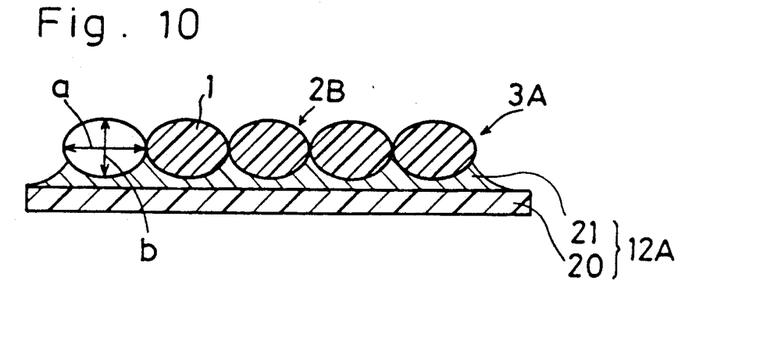
FIG. 10 is a schematic sectional view of a portion of the reflection-type polarizing screen in which polarizing fibers of a generally oval cross-sectional shape is employed.
Figure 11:
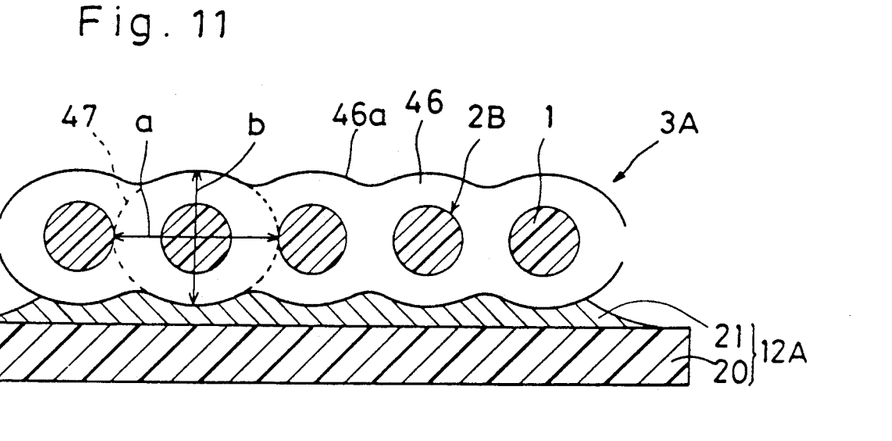
FIG. 11 is a schematic sectional view of a portion of the reflection-type polarizing screen in which a generally oval cross-sectional shape is represented by a portion of a transparent resin layer deposited on the polarizing fabric.

FIGS. 10 and 11 illustrate different cross-sectional shapes of the reflection-type polarizing screen 3A assembled with the foregoing results of the calculations taken into consideration.

Referring first to FIG. 10, the woven polarizing fabric 2B of the structure shown in FIG. 5 is positioned on the front surface of the reflecting sheet 21 applied to the front surface of the screen base 12A. Each of the polarizing fibers 1 used in this woven polarizing fabric 2B have a generally oval cross-sectional shape with its major axis oriented parallel to the screen base 12A and has the ratio (b/a) of the minimum diameter b relative to the maximum diameter a that is chosen within the range of 0.70 to 0.95. The polarizing fibers 1 of this oval cross-sectional shape can be obtained by suitably selecting the shape of a spinning nozzle. Alternatively, the polarizing fibers 1 of the oval cross-sectional shape can also be obtained by thermally pressing or ironing the woven polarizing fabric formed with the use of the polarizing fibers of a round cross-sectional shape.

Referring now to FIG. 11, the reflection-type polarizing screen 3A shown therein includes the woven polarizing fabric 2B formed by the use of the polarizing fibers 1 of a round cross-sectional shape. However, the front and rear surfaces of the woven polarizing fabric 2B shown in FIG. 11 is covered by a transparent covering layer 46 having a thickness of several micrometers and made of transparent synthetic resin such as, for example, acrylic resin, with the woven polarizing fabric 2B consequently embedded therein. This transparent covering layer 46 can be formed by immersing the woven polarizing fabric into a solution of transparent synthetic resin and subsequently drying the resin-impregnated woven polarizing fabric. If the viscosity of the solution of the synthetic resin into which the woven polarizing fabric 2B is immersed is properly selected, the transparent covering layer 46 eventually formed can fill up interstices in the woven polarizing fabric 2B, and the resultant transparent covering layer 46, when dried, can have its inner and outer surfaces each shaped so as to conform to indentations in the rear or front surface of the woven polarizing fabric 2B, respectively. Accordingly, a portion 46a of the outer surface of the transparent covering layer 46 around each polarizing fiber 1 can have a curvature depicting a portion of the oval shape shown by the phantom line 47 in FIG. 11. For the purpose of the present invention, the oval shape shown by the phantom line 47 in FIG. 11 has the ratio (b/a) of the minimum diameter b along the minor axis thereof relative to the maximum diameter a along the major axis thereof which is chosen within the range of 0.70 to 0.95 by the reason discussed hereinbefore.

The synthetic resin forming the transparent covering layer 46 is preferably of a kind having an index of refraction about equal to the index of refraction of the polarizing fiber 1 so that the reflection of light at the interface between the polarizing fibers 1 and the transparent covering layer 46 can be minimized.

According to the reflection-type polarizing screen 3A shown in and described with reference to any one of FIGS. 10 and 11, a relatively large viewing angle in a horizontal direction perpendicular to the longitudinal direction of the polarizing fibers 1 can be obtained while minimizing the uneven distribution of the luminosity from place to place within the coverage of the screen. Where the polarizing fibers 1 are thermally pressed or ironed so as to have the oval cross-sectional shape as shown in FIG. 10, or where the transparent covering layer 46 is utilized as shown in FIG. 11, the presence of gaps between each neighboring polarizing fibers 1 can be substantially eliminated and, therefore, when the reflecting film (similar to the reflecting layer 43 shown in FIG. 8) is formed on the rear surface of the woven polarizing fabric 2B subsequent to the formation of the woven polarizing fabric 2B by the use of the vapor deposition technique, the possibility of the material for the reflecting layer flowing onto the front surface of the woven polarizing fabric 2B can advantageously be eliminated.

Some embodiments of a polarizing member formed by the use of the woven polarizing fabric 2 in accordance with the present invention will now be described.

Figure 12A:
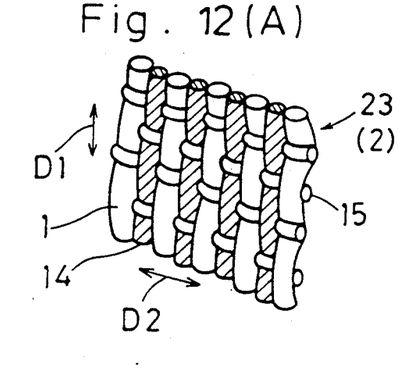
FIG. 12(A) is a schematic fragmentary perspective view of a portion of a polarizing member of transmission type utilizing the woven polarizing fabric according to the present invention.
Figure 12B:
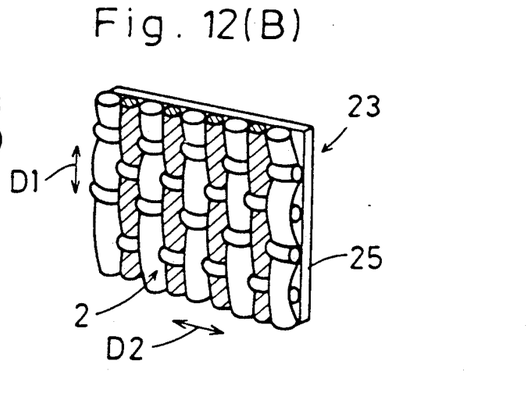
FIG. 12(B) is a view similar to FIG. 12(A), showing a modified form of the transmission-type polarizing member shown in FIG. 12(A)

The woven polarizing fabric 2 itself shown in FIG. 2 may be used as a polarizing member 23 of transmission type as shown in FIG. 12(A), or may be bonded, as shown in FIG. 12(B), to a principal surface of a support base 25 in the form of a sheet of transparent synthetic resin to thereby complete the polarizing member 23. In either example, the non-polarizing, opaque fibers 14 alternating the polarizing fibers 1 serve to fill up gaps between the neighboring polarizing fibers 1 and are colored either black (for absorbing all rays of light in the visible region of wavelength) or white (for reflecting all rays of light in the visible region of wavelength). Rays of light incident upon the woven polarizing fabric 2 may come from either rear or front of the woven polarizing fabric 2. As a matter of course, the use of the non-polarizing fibers 14 may be dispensed with if the polarizing fibers 1 are flexible and pliable.

Figure 13:
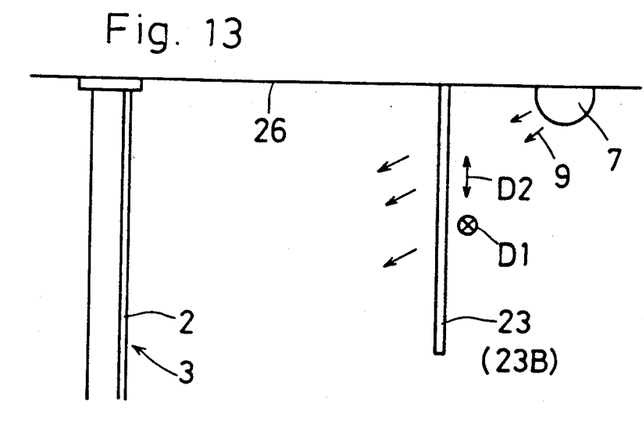
FIG. 13 is a schematic fragmentary side view of a video projector system according to the present invention in which the polarizing screen and the polarizing member are employed.

An example of use of the polarizing member 23 of the structure shown in any one of FIGS. 12(A) and 12(B) is shown in FIG. 13 wherein the polarizing member 23 is used as a hanging curtain positioned adjacent the illuminating lamp 7 and hung from the ceiling 26 so as to intervene between the screen 3 and the illuminating lamp 9. The polarizing curtain 23 so disposed as shown in FIG. 13 is effectively operable to polarize the illuminating light 9 emitted from the illuminating lamp 7 during the passage of such illuminating light 9 across the polarizing curtain 23. Therefore, if the direction in which the illuminating light 9 is polarized as it passes across the polarizing curtain 23 is chosen to be perpendicular to the polarizing direction of the woven polarizing fabric 2 used in the screen 3, that is, the polarizing curtain 23 is so oriented as to absorb a component of the illuminating light 9 having the first polarizing direction D1, but pass a component of the illuminating light 9 having the second polarizing direction D2, the illuminating light 9 polarized in the second polarizing direction D2 can be substantially entirely absorbed by the woven polarizing fabric 2 in the screen 3 and, therefore, any possible reduction in contrast of the picture projected on the screen can advantageously be minimized accompanied by an increase in sharpness of the projected picture. It is to be noted that the screen 3 shown in FIG. 13 may be either the transmission type or the reflection type and the polarizing curtain 23 equally works satisfactory regardless of the type of the screen.

It is eventually pointed out that, if the ceiling, the side walls and the floor defining the room are all covered or lined by the polarizing fabric so that the component of the illuminating light having the first polarizing direction D1 can be absorbed, but the component of the illuminating light having the second polarizing direction D2 can be passed, any possible reduction in contrast of the projected picture which would result from a disturbance in polarization of the reflected rays of light from such portions of the room can advantageously be avoided substantially.

Figure 14:
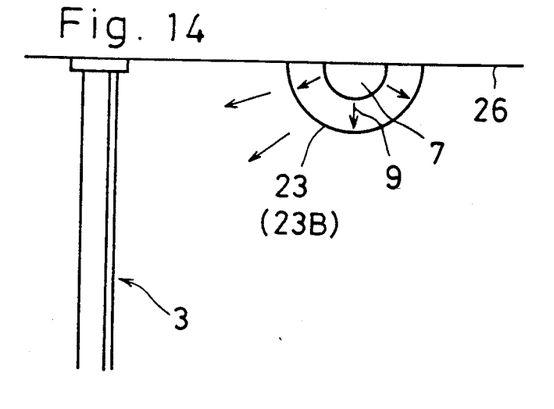
FIG. 14 is a schematic fragmentary side view of a modified form of the video projector system shown in FIG. 13.

While in the example shown in FIG. 13 the polarizing member 23 has been shown and described as hung from the ceiling, numerous methods can be employed as to the disposition of the polarizing member 23 in relation to the illuminating lamp 7. By way of example, as shown in FIG. 14, the polarizing fabric 2 may be used as a generally semi-cylindrical lamp shade enclosing the illuminating lamp 7.

Figure 15:
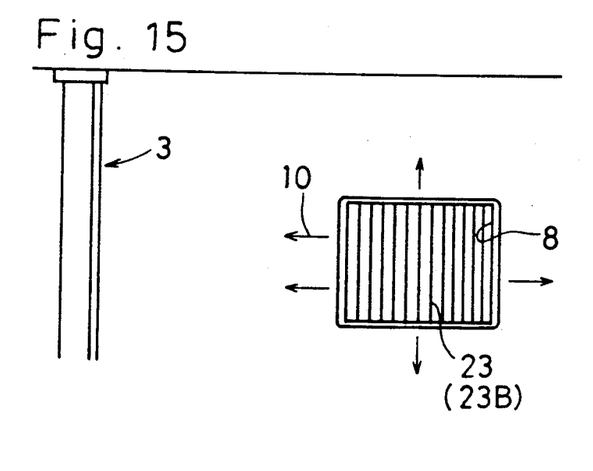
FIG. 15 is a schematic fragmentary side view of a further modified form of the video projector system, showing the use of the polarizing member as a window curtain.

FIG. 15 illustrates the example in which the polarizing member 23 is used so as to cover the window 8 which forms another source of light. In this example, the external rays of light entering into the room through the window 8 are polarized by the polarizing member 23 so as to have a second polarizing direction D2. The polarizing member 23 in this example may have its peripheral edge portion secured to a window frame or may be used as a curtain for selectively opening and covering the window 8.

Figure 16:
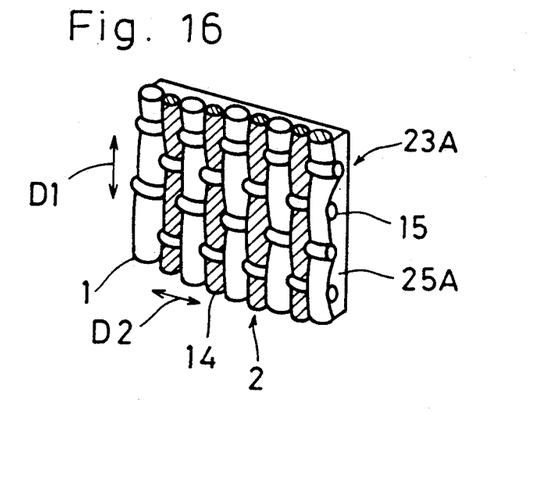
FIG. 16 is a schematic fragmentary perspective view of the polarizing member of reflection type utilizing the woven polarizing fabric.

FIG. 16 illustrates a portion of the polarizing member 23A of reflection type which is substantially similar to the polarizing member 23 shown in and described with reference to FIG. 12, except that the support base 25A is in the form of a reflecting sheet.

Figure 17:
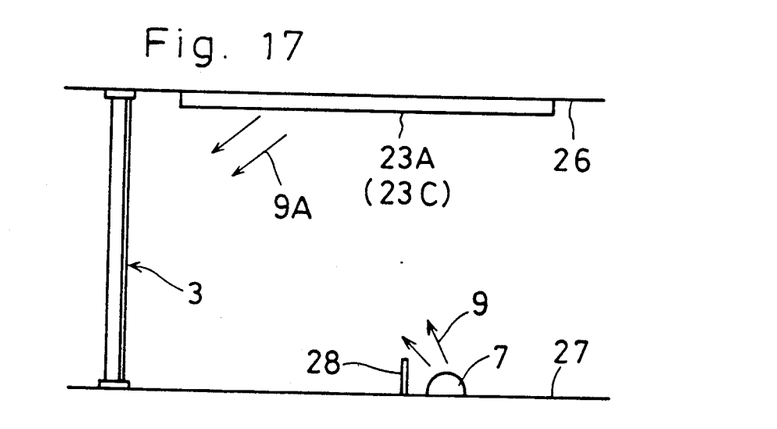
FIG. 17 is a schematic fragmentary side view, showing the application of the reflection-type polarizing member of FIG. 16 as lined to the ceiling in a room.

The polarizing member 23A of reflection type shown in FIG. 16 may be used, as shown in FIG. 17, as secured to the ceiling 26 where the illuminating lamp 9 is placed on the floor 27. In the example shown in FIG. 17, the polarizing member 23A serves to impart the second polarizing direction D2 to the illuminating light emitted by the illuminating lamp 7 as it reflects the illuminating light. Consequently, the reflected rays of light indicated by 9A are all absorbed by the woven polarizing fabric 2 forming a part of the screen 3 and, therefore, any possible reduction in contrast of the picture projected on the screen can advantageously be minimized accompanied by an increase in sharpness of the projected picture. In the environment of use of the polarizing member 23 such as shown in FIG. 17, a self-standing screen 28 is preferably placed adjacent the illuminating lamp 7 to prevent a portion of the illuminating light from impinging directly on the polarizing screen 3. It is to be noted that, other than the ceiling 26, the side walls and the floor may also be effectively covered by the polarizing members 23A of reflection type.

In any one of the foregoing embodiments, the polarizing screen has been described and shown as including the woven polarizing fabric. However, the polarizing screen can be formed by utilizing the polarizing fibers with out being woven. One illustrative method of forming a polarizing sheet having the juxtaposed polarizing fibers 1 and the non-polarizing, black fibers 14 alternating the polarizing fibers 1 is shown in FIG. 18.

Figure 18:
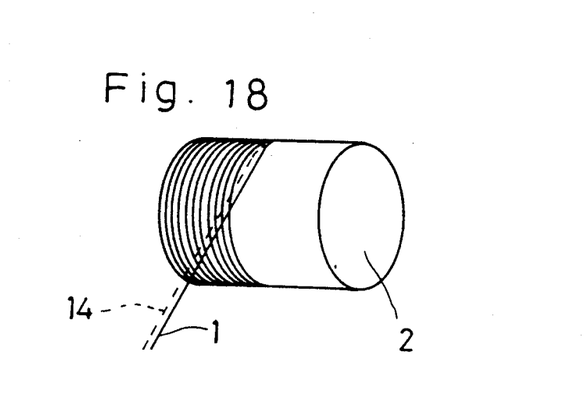
FIG. 18 is a schematic perspective view showing an illustrative method of making a polarizing sheet according to the present invention.

Referring to FIG. 18, juxtaposed filaments which eventually form the polarizing and non-polarizing fibers 1 and 14 are spirally turned around a drum 2 so that the polarizing and non-polarizing fibers 1 and 14 alternate with each other in a direction parallel to the longitudinal axis of the drum 2, and are then bonded together by applying a liquid binder of transparent synthetic resin to the turns of the filaments around the drum 2. After the binder has been dried, a cylinder formed by the bonded turns of the alternating polarizing and non-polarizing fibers 1 and 14 is removed from the drum 2 and is subsequently cut along a line parallel to the longitudinal axis of the cylinder to provide a polarizing sheet shown by 13 in FIGS. 19 to 23.

Figure 19:
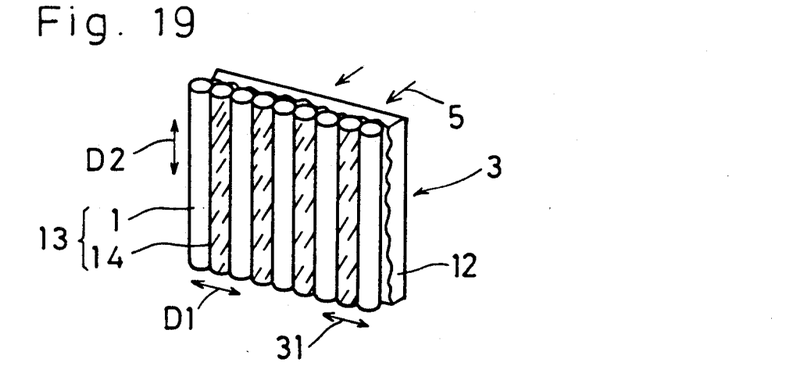
FIG. 19 is a schematic fragmentary perspective view of the polarizing fibers overlaid on a screen base to complete the polarizing screen of transmission type.

FIG. 19 illustrates the polarizing screen 3 formed with the use of the polarizing sheet 13 formed by the method shown in and described with reference to FIG. 18. The polarizing screen 3 shown in FIG. 19 comprises the screen base 12, which may be in the form of a Fresnel lens, having its front surface or a surface facing the viewer covered by the polarizing sheet 13. The polarizing sheet includes the polarizing fibers 1 so disposed and so oriented that the first polarizing direction D1 in which the polarizing fibers 1 polarize the incoming rays of light conforms to the particular polarizing direction of the projected rays of light 5 emanating from the picture projector. This polarizing sheet 13 also include the black fibers 14 in the form of the multi-filaments alternating the polarizing fiber 1. While the polarizing screen 3 is generally flat or curved in shape and of a large size, the polarizing sheet 13 conforming to the flat or curved shape of the resultant polarizing screen can easily be obtained as is the case with the previously discussed woven polarizing fabric.

The polarizing screen 3 of the structure shown in FIG. 19 operates in a manner substantially similar to the polarizing screen utilizing the woven polarizing fabric in that, since all of the projected rays of light 5 can pass across the polarizing screen 3, the luminance of the picture projected thereon can be maintained at a high level. Also, the illuminating light 9 and 10 coming from the illuminating lamp 7 and the window 8 are also shielded and, therefore, any possible reduction in contrast of the projected image is substantially eliminated, accompanied by an increase in sharpness of the projected picture.

The presence of the black fibers 14 alternating the polarizing fibers 1 are effective to improve the resolution of the projected picture and, also, since the black fibers 14 fill up the gaps between the neighboring polarizing fibers 1, any possible leakage of light through such gaps is advantageously eliminated.

The polarizing fibers 1 forming the polarizing sheet 13 function in a manner substantially similar to the cylindrical lens effective to increase the viewing angle in a horizontal direction 31 perpendicular to the longitudinal direction of the polarizing fibers 1 and, hence, serve as a well known lenticular lens.

Each of the polarizing fibers 1 forming the polarizing sheet 13 together with the black fibers 14 may have any suitable cross-sectional shape such as, for example, an oval cross-sectional shape or a generally rectangular cross-sectional shape, which may be chosen in consideration with the requirement concerning the viewing angle.

Figure 20:
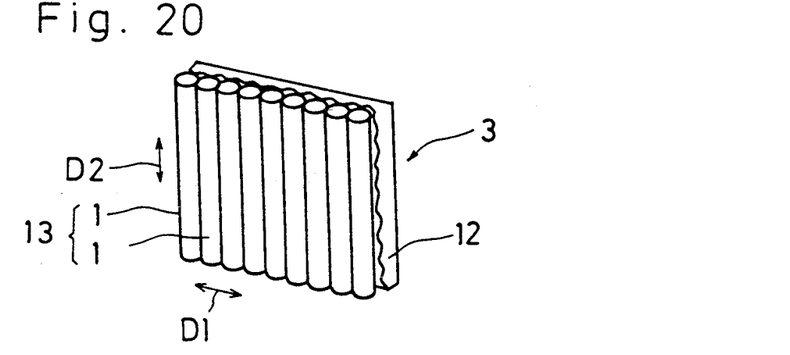
FIG. 20 is a schematic fragmentary perspective view showing a modified form of the polarizing screen of transmission type shown in FIG. 19.

The black fibers 14 forming the polarizing sheet 13 together with the polarizing fibers 1 may not be employed where no effect similar to that brought about by the well known black stripe pattern used in the color cathode ray tube is required and/or the polarizing fibers 1 themselves are flexible and pliable. One example of the polarizing screen 3 formed by the sole use of the polarizing fibers 1 and without the use of the black fibers is illustrated in FIG. 20.

Figure 21:
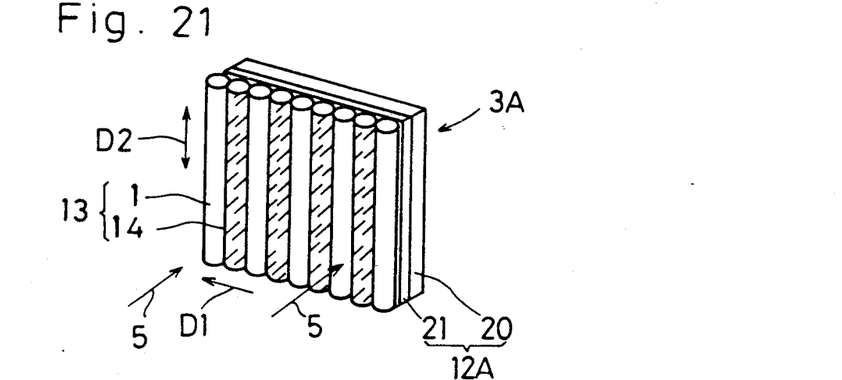
FIG. 21 is a schematic fragmentary perspective view of the polarizing fibers overlaid on a screen base to complete the polarizing screen of reflection type.

FIG. 21 illustrates the polarizing screen of reflection type which is formed by the use of the polarizing sheet 13 formed by the method shown in and described with reference to FIG. 18. The reflection-type polarizing screen identified by 3A in FIG. 21 comprises the screen base 12A including a substrate 20 in the form of, for example, a flexible poly(vinyl chloride) sheet and a reflecting film applied to the front surface of the substrate 20, and the polarizing sheet 13 overlaying the front surface of the screen base 12A, that is, the reflecting film 21. The polarizing sheet 13 used therein is similar to that shown in and described with reference to FIG. 19 and includes the polarizing fibers 1 and the black fibers 14 alternating the polarizing fibers 1. As is the case with the screen shown in FIG. 19, the polarizing sheet 13 is so disposed and so oriented that the first polarizing direction D1 in which the polarizing fibers 1 polarize the incoming rays of light conform to the particular polarizing direction of the projected rays of light 5 emanating from the picture projector.

Even the polarizing screen 3A of reflection type shown in FIG. 21 operates in a manner similar to, and can bring about effects similar to those brought about by the polarizing screen of transmission type shown in FIG. 19.

Hereinafter, the polarizing member utilizing the polarizing fibers shown in FIG. 1 will be described with reference to FIGS. 22 and 23.

Figure 22:
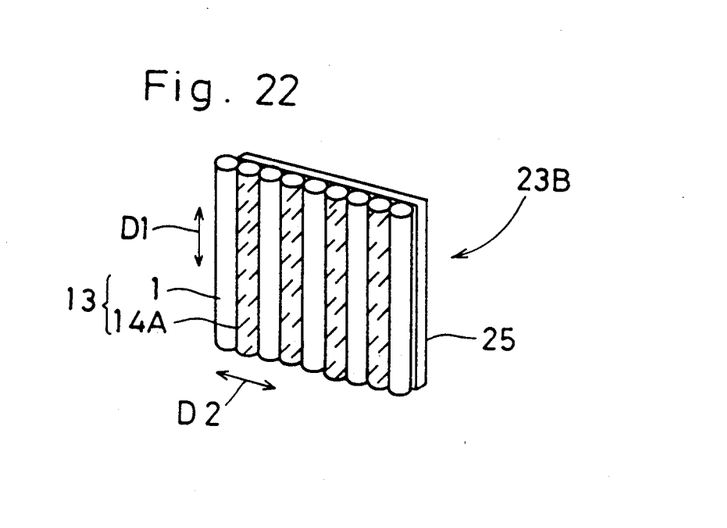
FIG. 22 is a schematic fragmentary perspective view of the polarizing fibers overlaid on a support base to complete the polarizing member of transmission type.

The polarizing member 23B shown in FIG. 22 is the transmission type and comprises a support base 25 in the form of a sheet of transparent synthetic resin having a principal surface on which the polarizing and non-polarizing fibers 1 and 14A are bonded in alternating fashion with each other and also in parallel relation to each other. The non-polarizing fibers 14A used therein are colored and employed in the form of colored multi-filaments.

The transmission-type polarizing member 23B of the structure shown in and described with reference to FIG. 22 is effective to receive the incident rays of light on a relatively large surface and then to polarize them in a desired direction. The colored, non-polarizing fibers 14A serve to fill up gaps between the neighboring polarizing fibers 1 and are colored either black (for absorbing all rays of light in the visible region of wavelength) or white (for reflecting all rays of light in the visible region of wavelength). Rays of light incident upon the polarizing member 23B may come from either rear or front of the polarizing member 23B, that is, in a direction facing the support base 25 or in a direction facing the polarizing fibers 1.

This transmission-type polarizing member 23B of the structure shown in and described with reference to FIG. 22 may be used in practice in a manner similar to that shown in and described with reference to any one of FIGS. 13 to 15.

Figure 23:
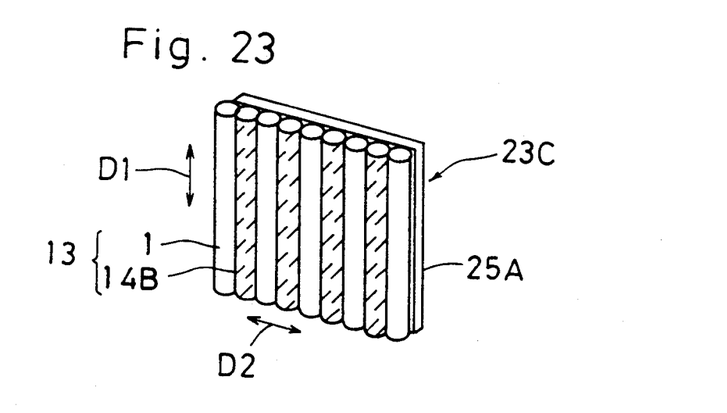
FIG. 23 is a schematic fragmentary perspective view of the polarizing fibers overlaid on a support base to complete the polarizing member of reflection type.

The polarizing member 23C shown in FIG. 23 is the reflection type and is of a structure substantially similar to the transmission type shown in FIG. 22, except that the support base 25A employed in the polarizing member 23C of FIG. 23 is in the form of a reflecting sheet. This reflection-type polarizing member 23C is used in practice in a manner similar to that shown in, for example, FIG. 17.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, if any one of the polarizing member 23, 23A, 23B or 23C is used to polarize the illuminating light used to illuminate the room in which, in addition to the polarizing screen for use with the projection-type television receiver set, a word-processor having a liquid crystal display device and/or a hologram display are placed, not only can the picture projected on the polarizing screen be viewed sharp, but any image displayed on the word-processor display and/or the hologram display can also be viewed sharp.

Accordingly, such changes and modifications are, unless they depart from the spirit and scope of the present invention as delivered from the claims annexed hereto, to be construed as included therein.

What is claimed is:

1. A polarizing screen for visually presenting a picture in response to receipt of projected imagewise rays of light having a first polarizing direction, said polarizing screen comprising;
    a screen base having first and second surfaces opposite to each other, said first surface when the polarizing screen is in use facing a viewer; and
    a polarizing fabric overlaying the first surface of the screen base and operable to pass therethrough the projected imagewise rays of light having the first polarizing direction, but absorb rays of light having a second polarizing direction perpendicular to the first polarizing direction;
    said polarizing fabric includes a plurality of juxtaposed polarizing fibers operable to pass therethrough the projected imagewise rays of light having the first polarizing direction, but absorb rays of light having the second polarizing direction and a plurality of juxtaposed non-polarizing fibers interlaced with said juxtaposed polarizing fibers so as to extend perpendicular to said juxtaposed polarizing fibers; and
    each of said polarizing fibers being made of material having an affinity with a polarization developing substance and added with the polarization developing material, said each polarizing fiber being elongated in a lengthwise direction conforming to the second polarizing direction.

2. The polarizing screen as claimed in claim 1, wherein said polarizing screen is a reflection type operable to reflect the projected imagewise rays of light towards a viewer, and wherein the polarizing fabric overlaying a reflecting surface of the screen base includes the polarizing fibers being of a generally oval cross-sectional shape having a ratio of the minimum diameter, as measured along the minor axis of the oval shape, relative to the maximum diameter, as measured along the major axis of the oval shape, which is within the range of 0.70 to 0.95.

3. The polarizing screen as claimed in claim 1, wherein said polarizing screen is a reflection type operable to reflect the projected imagewise rays of light towards a viewer, and wherein the polarizing fabric overlaying a reflecting surface of the screen base has one of opposite surfaces of the polarizing fabric remote from the screen base which is covered by a transparent layer of synthetic resin, a portion of said transparent layer around one of the polarizing fibers being curved so as to occupy a portion of a geometric oval shape, said oval shape having a ratio of the minimum diameter, as measured along the minor axis of the oval shape, relative to the maximum diameter, as measured along the major axis of the oval shape, which is within the range of 0.70 to 0.95.

4. The polarizing screen as claimed in claim 1, further comprising a plurality of non-polarizing fibers being in the form of multi-filaments and disposed so as to alternate the polarizing fiber, and wherein each of said polarizing fibers is in the form of a mono-filament.

5. The polarizing screen as claimed in claim 1, wherein said material having an affinity with the polarization developing substance is poly(ethylene-co-vinyl alcohol).

6. A polarizing screen for visually presenting a picture in response to receipt of projected imagewise rays of light having a first polarizing direction, said polarizing screen comprising;
    a screen base having first and second surfaces opposite to each other, said first surface when the polarizing screen is in use facing a viewer; and
    a plurality of juxtaposed polarizing fibers overlaying the first surface of the screen base and operable to pass therethrough the projected imagewise rays of light having the first polarizing direction, but absorb rays of light having a second polarizing direction perpendicular to the first polarizing direction, and
    each of said polarizing fibers being made of material having an affinity with a polarization developing substance and added with the polarization developing material, said each polarizing fiber being elongated in a lengthwise direction conforming to the second polarizing direction.

7. The polarizing screen as claimed in claim 6, wherein said polarizing screen is a reflection type operable to reflect the projected imagewise rays of light towards a viewer, and wherein each of said polarizing fibers overlaying a reflecting surface of the screen base is of a generally oval cross-sectional shape having a ratio of the minimum diameter, as measured along the minor axis of the oval shape, relative to the maximum diameter, as measured along the major axis of the oval shape, which is within the range of 0.70 to 0.95.

8. The polarizing screen as claimed in claim 6, wherein said polarizing screen is a reflection type operable to reflect the projected imagewise rays of light towards a viewer, and wherein each of the polarizing fibers overlaying a reflecting surface of the screen base has one of opposite surfaces of the polarizing fiber remote from the screen base which is covered by a transparent layer of synthetic resin, a portion of said transparent layer around one of the polarizing fibers being curved so as to occupy a portion of a geometric oval shape, said oval shape having a ratio of the minimum diameter, as measured along the minor axis of the oval shape, relative to the maximum diameter, as measured along the major axis of the oval shape, which is within the range of 0.70 to 0.95.

9. The polarizing screen as claimed in claim 6, further comprising a plurality of non-polarizing fibers being in the form of multi-filaments and disposed so as to alternate the polarizing fiber, and wherein each of said polarizing fibers is in the form of a mono-filament.

10. The polarizing screen as claimed in claim 6, wherein said material having an affinity with the polarization developing substance is poly(ethylene-co-vinyl alcohol).

11. A video projector system which comprises:
a video projector for projecting imagewise rays of light having a first polarizing direction; and
a polarizing screen for visually presenting a picture in response to receipt of the projected imagewise rays of light; and
a polarizing member adapted to be installed within a room, where the polarizing screen is installed, so as to face towards a source of light that is used to illuminate the room, said polarizing member being operable to polarize rays of light emitted from the light source and travelling towards the polarizing screen;
said polarizing screen comprising a screen base having first and second surfaces opposite to each other, said first surface when the polarizing screen is in use facing a viewer; and a polarizing fabric overlaying the first surface of the screen base and operable to pass therethrough the projected imagewise rays of light having the first polarizing direction, but absorb rays of light having a second polarizing direction perpendicular to the first polarizing direction;
said polarizing member comprising a polarizing fabric operable to pass therethrough the projected imagewise rays of light having the first polarizing direction, but absorb rays of light having the second polarizing direction;
said polarizing fabric including a plurality of juxtaposed polarizing fibers operable to pass therethrough the projected imagewise rays of light having the first polarizing direction, but absorb rays of light having the second polarizing direction and a plurality of juxtaposed non-polarizing fibers interlaced with said juxtaposed polarizing fibers so as to extend perpendicular to said juxtaposed polarizing fibers; and
each of said polarizing fibers being made of material having an affinity with a polarization developing substance and added with the polarization developing material, said each polarizing fiber being elongated in a lengthwise direction conforming to the second polarizing direction.

12. A video projector system which comprises:
a video projector for projecting imagewise rays of light having a first polarizing direction; and
a polarizing screen for visually presenting a picture in response to receipt of the projected imagewise rays of light; and
a polarizing member adapted to be installed within a room, where the polarizing screen is installed, so as to face towards a source of light that is used to illuminate the room, said polarizing member being operable to polarize rays of light emitted from the light source and travelling towards the polarizing screen;
said polarizing screen comprising a screen base having first and second surfaces opposite to each other, said first surface when the polarizing screen is in use facing a viewer, and a plurality of juxtaposed polarizing fibers overlaying the first surface of the screen base and operable to pass therethrough the projected imagewise rays of light having the first polarizing direction, but absorb rays of light having a second polarizing direction perpendicular to the first polarizing direction,
said polarizing member comprising a plurality of juxtaposed polarizing fibers overlaying the first surface of the screen base and operable to pass therethrough the projected imagewise rays of light having the first polarizing direction, but absorb rays of light having the second polarizing direction;
each of said polarizing fibers being made of material having an affinity with a polarization developing substance and added with the polarization developing material, said each polarizing fiber being elongated in a lengthwise direction conforming to the second polarizing direction.

13. A polarizing theater system which comprises:
a video projector for projecting imagewise rays of light having a first polarizing direction;
a space for accommodating at least one viewer; and
a polarizing screen for visually presenting a picture in response to receipt of the projected imagewise rays of light; and
a polarizing member adapted to be installed within the space, where the polarizing screen is installed, so as to face towards a source of light that is used to illuminate the space, said polarizing member being operable to polarize rays of light emitted from the light source and travelling towards the polarizing screen;
said polarizing screen comprising a screen base having first and second surfaces opposite to each other, said first surface when the polarizing screen is in use facing a viewer; and a polarizing fabric overlaying the first surface of the screen base and operable to pass therethrough the projected imagewise rays of light having the first polarizing direction, but absorb rays of light having a second polarizing direction perpendicular to the first polarizing direction;
said polarizing member comprising a polarizing fabric operable to pass therethrough the projected imagewise rays of light having the first polarizing direction, but absorb rays of light having the second polarizing direction; and said polarizing fabric including a plurality of juxtaposed polarizing fibers operable to pass therethrough the projected imagewise rays of light having the first polarizing direction, but absorb rays of light having the second polarizing direction and a plurality of juxtaposed non-polarizing fibers interlaced with said juxtaposed polarizing fibers so as to extend perpendicular to said juxtaposed polarizing fibers; and each of said polarizing fibers being made of material having an affinity with a polarization developing substance and added with the polarization developing material, said each polarizing fiber being elongated in a lengthwise direction conforming to the second polarizing direction.

14. A polarizing theater system which comprises:

a video projector for projecting imagewise rays of light having a first polarizing direction;

a space for accommodating at least one viewer; and a polarizing screen for visually presenting a picture in response to receipt of the projected imagewise rays of light; and a polarizing member adapted to be installed within the space, where the polarizing screen is installed, so as to face towards a source of light that is used to illuminate the space, said polarizing member being operable to polarize rays of light emitted from the light source and travelling towards the polarizing screen;

said polarizing screen comprising a screen base having first and second surfaces opposite to each other, said first surface when the polarizing screen is in use facing the viewer, and a plurality of juxtaposed polarizing fibers overlaying the first surface of the screen base and operable to pass therethrough the projected imagewise rays of light having the first polarizing direction, but absorb rays of light having a second polarizing direction perpendicular to the first polarizing direction, said polarizing member comprising a plurality of juxtaposed polarizing fibers overlaying the first surface of the screen base and operable to pass therethrough the projected imagewise rays of light having the first polarizing direction, but absorb rays of light having the second polarizing direction;

each of said polarizing fibers being made of material having an affinity with a polarization developing substance and added with the polarization developing material, said each polarizing fiber being elongated in a lengthwise direction conforming to the second polarizing direction.

15. A woven polarizing fabric for use in a screen for visually presenting a picture in response to receipt of the projected imagewise rays of light having a first polarizing direction, said woven polarizing fabric being overlaid on one surface of the screen facing towards a viewer and operable to pass therethrough the imagewise rays of light, but absorb rays of light having a second polarizing direction perpendicular to the first polarizing direction, said woven polarizing fabric comprising:

a plurality of juxtaposed polarizing fibers operable to pass therethrough the projected imagewise rays of light having the first polarizing direction, but absorb rays of light having the second polarizing direction, and a plurality of juxtaposed non-polarizing transparent fibers interlaced with said juxtaposed polarizing fibers so as to extend perpendicular to said juxtaposed polarizing fibers;

each of said polarizing fibers being made of material having an affinity with a polarization developing substance and added with the polarization developing material, said each polarizing fiber being elongated in a lengthwise direction conforming to the second polarizing direction.

16. A polarizing fiber adapted to cover one surface of a screen for visually presenting a picture in response to receipt of the projected imagewise rays of light having a first polarizing direction, said one surface of the screen facing towards a viewer, and said polarizing fiber being operable to pass therethrough the imagewise rays of light, but absorb rays of light having a second polarizing direction perpendicular to the first polarizing direction, said polarizing fiber being made of material having an affinity with a polarization developing substance and added with the polarization developing material, said each polarizing fiber being elongated in a lengthwise direction conforming to the second polarizing direction.

* * * * *